(12) United States Patent
Esposito et al.

(10) Patent No.: US 9,389,596 B2
(45) Date of Patent: Jul. 12, 2016

(54) SYSTEMS AND METHODS FOR FIELD DEVICE FEEDBACK

(71) Applicant: General Electric Company, Schenectady, NY (US)

(72) Inventors: Sandro Esposito, Katy, TX (US); John Alexander Petzen, Roanoke, VA (US); Vladimir Dimitrov Kostadinov, Sharon, MA (US)

(73) Assignee: General Electric Company, Schenectady, NY (US)

( * ) Notice: Subject to any disclaimer, the term of this patent is extended or adjusted under 35 U.S.C. 154(b) by 459 days.

(21) Appl. No.: 13/772,233

(22) Filed: Feb. 20, 2013

(65) Prior Publication Data
US 2014/0236318 A1 Aug. 21, 2014

(51) Int. Cl.
*G05B 11/01* (2006.01)
*G05B 19/042* (2006.01)

(52) U.S. Cl.
CPC ............ *G05B 11/01* (2013.01); *G05B 19/0423* (2013.01)

(58) Field of Classification Search
USPC ............... 700/287, 122, 86, 79, 78, 108, 282; 710/104; 702/183, 47
See application file for complete search history.

(56) References Cited

U.S. PATENT DOCUMENTS

| | | | |
|---|---|---|---|
| 5,970,430 A | 10/1999 | Burns et al. | |
| 6,539,267 B1 * | 3/2003 | Eryurek et al. | 700/51 |
| 7,516,043 B2 * | 4/2009 | Junk | G05B 19/0428 701/31.4 |
| 8,160,535 B2 * | 4/2012 | Kielb et al. | 455/343.1 |
| 8,312,892 B2 * | 11/2012 | Wilke | F16K 31/1262 137/312 |
| 8,838,413 B2 * | 9/2014 | Genta | G05B 23/00 702/179 |
| 2002/0097031 A1 * | 7/2002 | Cook et al. | 323/273 |
| 2004/0148513 A1 | 7/2004 | Scott et al. | |
| 2005/0274417 A1 * | 12/2005 | Perry et al. | 137/487.5 |
| 2008/0163936 A1 * | 7/2008 | Boger | F15B 5/006 137/455 |
| 2009/0216350 A1 * | 8/2009 | Boger | F15B 5/006 700/79 |
| 2009/0222220 A1 * | 9/2009 | Wilke | 702/34 |
| 2010/0164717 A1 | 7/2010 | Hammer et al. | |
| 2011/0001070 A1 * | 1/2011 | Wilke | F16K 31/1262 251/129.03 |

FOREIGN PATENT DOCUMENTS

| | | |
|---|---|---|
| DE | 102007026244 A1 | 12/2008 |
| EP | 2530546 A2 | 12/2012 |

OTHER PUBLICATIONS

PCT Search Report and Written Opinion issued May 13, 2014 in connection with corresponding PCT Patent Application No. PCT/US2014/012258.

* cited by examiner

*Primary Examiner* — Kidest Bahta
(74) *Attorney, Agent, or Firm* — Fletcher Yoder, P.C.

(57) ABSTRACT

The embodiments described herein include a system and a method. In one embodiment, a system includes an industrial controller configured to control a first field device. The first field device includes an actuator and a positioner coupled to the actuator. The positioner is configured to position the actuator. The first field device is configured to detect an undesired condition and to communicate the undesired condition to the industrial controller by using a ReadBack facility of the first field device.

17 Claims, 5 Drawing Sheets

SYSTEMS AND METHODS FOR FIELD DEVICE FEEDBACK

BACKGROUND OF THE INVENTION

The subject matter disclosed herein relates to systems and methods for feedback of certain devices, and more specifically, in field devices.

Certain systems, such as industrial control systems, may include capabilities that enable the system to detect and correct undesired conditions within the system. For example, the Foundation Fieldbus protocol provides smart field devices with the ability to communicate conditions that are related to the hardware and/or software health of the device to the control system's control strategy. However, when the undesired condition is not part of the hardware or software, the smart field device by itself may be unable to communicate the presence of the undesired condition. This could include conditions like insufficient air pressure to a pneumatic digital valve.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an industrial controller configured to control a first field device. The first field device includes an actuator and a positioner coupled to the actuator. The positioner is configured to position the actuator. The first field device is configured to detect an undesired condition and to communicate the undesired condition to the industrial controller by using a ReadBack facility of the first field device.

In a second embodiment, a method includes determining a state of a field device. And if the state includes an undesired condition, then deriving an indication of an undesired condition and adding the indication of the undesired condition to a ReadBack facility. The method further includes communicating the indication to a control block.

In a third embodiment, a non-transitory tangible computer-readable medium storing a plurality of instructions executable by a processor of an electronic device, the instructions include instructions to determine a state of a field device. If the state includes an undesired condition, the instructions also include instructions to derive an indication of the undesired condition. The instructions further include instructions to add the indication of the undesired condition to a ReadBack facility and instructions to communicate the indication to a control block.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain industrial control systems include industrial controllers suitable for interfacing with a variety of field devices, such as sensors, pumps and valves. For example, an industrial controller may direct a pneumatic valve to set the valve's actuator at a certain position to affect the flow through the valve. However, desired functioning of the pneumatic valve may be affected by undesired conditions, such as insufficient air pressure used to control the valve or a foreign object in the valve. In order for the industrial controller to take appropriate ameliorative action, undesired conditions may be detected and communicated to the industrial controller.

In field devices compliant with a Foundation Fieldbus protocol, the field devices will have the capability to transmit feedback to the industrial controller issues that relate to the hardware and/or software of the device on a periodic basis. For example, the Foundation Fieldbus protocol, International Electrotechnical Commission (IEC) 61804, is a two-way communication system, which interconnects various fieldbus devices such as sensors, pumps, valves, industrial controllers, and the like, via a local area network (LAN). However, the Foundation Fieldbus protocol does not include the same feedback ability for communicating undesired conditions, such as insufficient air pressure, because the field device itself is not defective or faulted. The insufficient air pressure may be attributed to an air supply external to the field device. Other undesired conditions may include low actuation amperage, a sticky valve, or a foreign object in a valve. It may be plausible to implement a solution that uses additional function blocks to specifically monitor parameters like supply air pressure. However, the use of the additional function blocks requires additional processing power and bandwidth, which may result in slower execution. In some cases the host may poll for an undesired condition during a specified time, often close to 30 or more seconds. A "macrocycle," as discussed herein, may refer to a cycle of scheduled function block execution, scheduled communication time, and a portion of time reserved for asynchronous communications (e.g., alerts and/or downloads) by devices on a communications segment (e.g., an H1 segment).

The disclosed embodiments provide a system and method to provide field device feedback, especially for those parameters not included in the health definitions of the Foundation Fieldbus protocol. In one embodiment, by utilizing the Read-Back facility of Foundation Fieldbus function blocks, the present techniques are able to detect and communicate an undesired fault condition and recovery from the fault condition to the industrial controller without the use of additional or custom function blocks and without the need for additional bandwidth within the macrocycle. Furthermore, because when a field device is not functioning as desired due to an undesired condition, it may be very useful to take ameliorative action as quickly as possible. If the techniques described herein are enabled during commissioning, the disclosed embodiments may be able to almost immediately switch to an OOS (Out of Service), Manual, or Local Override Mode, which signals to the industrial controller that the field device is not responding because a fault state is active. The industrial controller can then take further actions based on feedback, which may include information concerning undesired field device conditions (e.g., low actuation air pressure, low actuation amperage, sticky valve, or foreign object in a valve).

Figure 1:
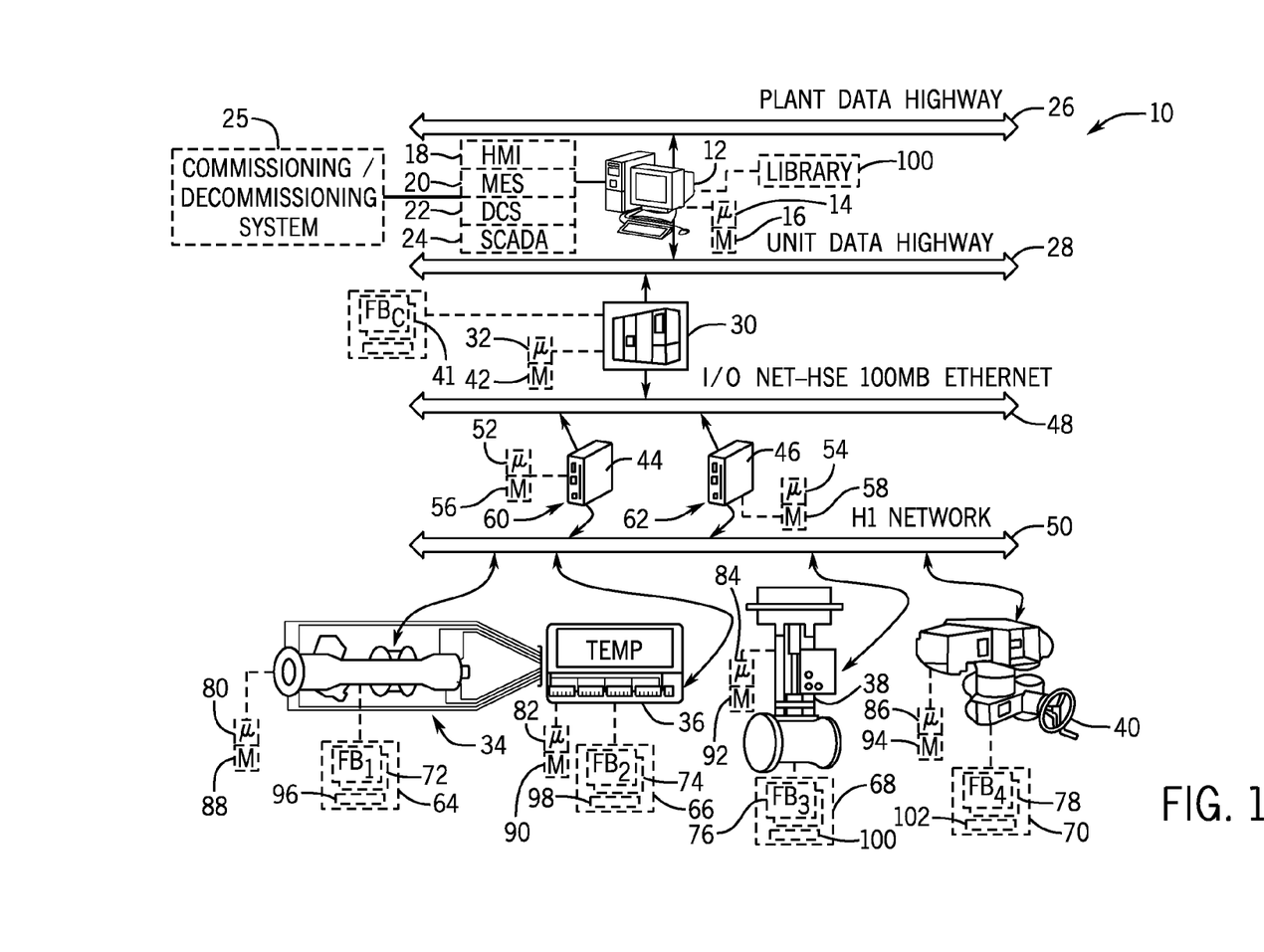
FIG. 1 is a schematic diagram of an embodiment of an industrial control system, including an industrial controller and a valve.

Turning to FIG. 1, an embodiment of an industrial control system 10 is depicted. The industrial control system 10 may include a computer system 12 suitable for executing a variety of field device configuration and monitoring applications, and for providing an operator interface through which an engineer or technician may monitor the components of the control system 10. Accordingly, the computer 12 includes a processor 14 that may be used in processing computer instructions, and a memory 16 that may be used to store computer instructions and other data. The computer system 12 may include any type of computing device or a combination of computing devices suitable for running software applications, such as a laptop, a workstation, a tablet computer, or a handheld portable device (e.g., personal digital assistant or cell phone). Indeed, the computer system 12 may include any of a variety of hardware and/or operating system platforms. In accordance with one embodiment, the computer 12 may host an industrial control software, such as a human-machine interface (HMI) software 18, a manufacturing execution system (MES) 20, a distributed control system (DCS) 22, and/or a supervisor control and data acquisition (SCADA) system 24. A commissioning/decommissioning system 25 may be included in the HMI 18, MES 20, DCS 22, and/or SCADA 24, and used to commission and/or decommission certain devices, as described in more detail below. The HMI 18, MES 20, DCS 22, SCADA 24 and/or commissioning/decommissioning system 25, may be stored as executable code instructions on non-transitory tangible computer readable media, such as the memory 16 of the computer 12. For example, the computer 12 may host the ToolboxST™ and/or ControlST™ software, available from General Electric Company, of Schenectady, N.Y.

Further, the computer system 12 is communicatively connected to a plant data highway 26 suitable for enabling communication between the depicted computer 12 and other computers 12 in the plant. Indeed, the industrial control system 10 may include multiple computer systems 12 interconnected through the plant data highway 26. The computer system 12 may be further communicatively connected to a unit data highway 28, suitable for communicatively coupling the computer system 12 to an industrial controller 30. The industrial controller 30 may include a processor 32 and memory 42 suitable for executing a control strategy useful in automating a variety of plant equipment, such as a turbine system 34 (e.g., gas turbine, steam turbine, water turbine, wind turbine etc.), a power generation system, a heat recovery steam generator (HRSG), a gas treatment system, a temperature sensor 36, a valve 38, and a pump 40. This may be implemented through the use of one more function blocks 41 executable by the industrial controller 30. In some embodiments, the industrial controller 30 may be a proportional-integral-derivative (PID) controller. Accordingly, the PID controller may be implemented by a PID function block. The function blocks 41 may include computer instructions or computer logic executable by processor 32. The industrial controller 30 may communicate with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller 30 may be a Mark™ VIe controller system, available from General Electric Co., of Schenectady, N.Y., including a triple modular redundant (TMR) controller 30 having three cores (e.g., R, S, T) suitable for redundant controller operations. For example, the R, S, and T cores may vote to determine control actions.

In the depicted embodiment, the turbine system 34, the temperature sensor 36, the valve 38, and the pump 40 are communicatively connected to the industrial controller 30 by using linking devices 44 and 46 suitable for interfacing between an I/O network 48 and an H1 network 50. For example, the linking devices 44 and 46 may include the FG-100 linking device, available from Softing AG, of Haar, Germany. As depicted, the linking devices 44 and 46 may include processors 52 and 54, respectively, useful in executing computer instructions, and may also include memory 56 and 58, useful in storing computer instructions and other data. In some embodiments, the I/O network 48 may be a 100 Megabit (MB) high speed Ethernet (HSE) network, and the H1 network 50 may be a 31.25 kilobit/second network. Accordingly, data transmitted and received through the I/O network 48 may in turn be transmitted and received by the H1 network 50. That is, the linking devices 44 and 46 may act as bridges between the I/O network 48 and the H1 network 50. For example, higher speed data on the I/O network 48 may be buffered, and then transmitted at suitable speed on the H1 network 50. Accordingly, a variety of field devices may be linked to the industrial controller 30 and to the computer 12. For example, the field devices 34, 36, 38, and 40 may include industrial devices, such as Fieldbus Foundation devices that include support for the Foundation H1 bi-directional communications protocol. The field devices 34, 36, 38, and 40 may also include support for other communication protocols, such as those found in the HART® Communications Foundation (HCF) protocol, and the Profibus Nutzer Organization e.V. (PNO) protocol.

Each of the linking devices 44 and 46 may include one or more segment ports 60 and 62 useful in segmenting the H1 network 50. For example, the linking device 44 may use the segment port 60 to communicatively couple with the devices 34 and 36, while the linking device 46 may use the segment port 62 to communicatively couple with the devices 38 and 40. Distributing the input/output between the field devices 34, 36, 38, and 40, by using, for example, the segment ports 60 and 62, may enable a physical separation useful in maintaining fault tolerance, redundancy, and improving communications time.

Each field device 34, 36, 38, and 40 may include a respective device description (DD) file, such as the depicted DD files 64, 66, 68, and 70. The DD files 64, 66, 68, and 70 may be written in a device description language (DDL), such as the DDL defined in the International Electrotechnical Commission (IEC) 61804 standard. In some embodiments, the files 64, 66, 68, and 70 are tokenized binary files. That is, the DD files 64, 66, 68, and 70 may include data formatted in a tokenized binary format useful in reducing the size of the DD files 64, 66, 68, and 70. The DD files 64, 66, 68, and 70 may each include one or more function blocks 72, 74, 76, and 78. The function blocks 72, 74, 76, and 78 may include computer instructions or computer logic executable by processors 80, 82, 84, and 86. Indeed, the function blocks 72, 74, 76, and 78 may be instantiated into memory 88, 90, 92, 94, and then executed by the processors 80, 82, 84, and 86, respectively. Each of the DD files 64, 66, 68, and 70 may also include device information 96, 98, 100, and 102, such as manufacturer identification (ID), device type, device revision, DD revision, and/or update revision, which may be used during commissioning or decommissioning by the commissioning/decommissioning system 25. In this way, the field devices 34, 36, 38, and 40 may contribute control logic and other computer instructions towards the execution of processes in the industrial process control system 10.

In one example, a placeholder may be created by the commissioning/decommissioning system 25. The placeholder may be an object stored in memory 16 that represents the field device 38. Accordingly, a user may pre-commission a system by creating one or more of the placeholder, each of the placeholders representing the device 38, and then use the placeholder(s) during commissioning of the physical field device 38. The placeholder may include physical device (PD) tag, manufacturer ID, device type, device revision, DD revision, and/or update revision representative of the field device 38. The PD tag may include a device name useful in identifying the device 38. Likewise, the manufacturer ID may include information identifying the manufacturer of the device 34. The device type may be suitable for identifying the type of device (e.g., valve, sensor, actuator), while the device revision may be a version number indentifying the device version. Likewise, the DD revision may identify the DD version, such as a DD file version included in the device 38. It should be appreciated that in another embodiment, the device 38 may be commissioned without using the placeholder. In one embodiment, field device 38 may be a flow control device, such as a valve, flow and/or pressure regulator, flow restrictor or any combination thereof. For example the field device 38 may be a valve such as a pneumatic actuated valve, a hydraulic actuated valve, an electricity driven valve or any combination thereof. As described above, undesired conditions may hinder the operation of the field device 38. Accordingly, FIG. 2 describes an exemplary pneumatic device as well as undesired conditions, such as insufficient air pressure.

Figure 2:
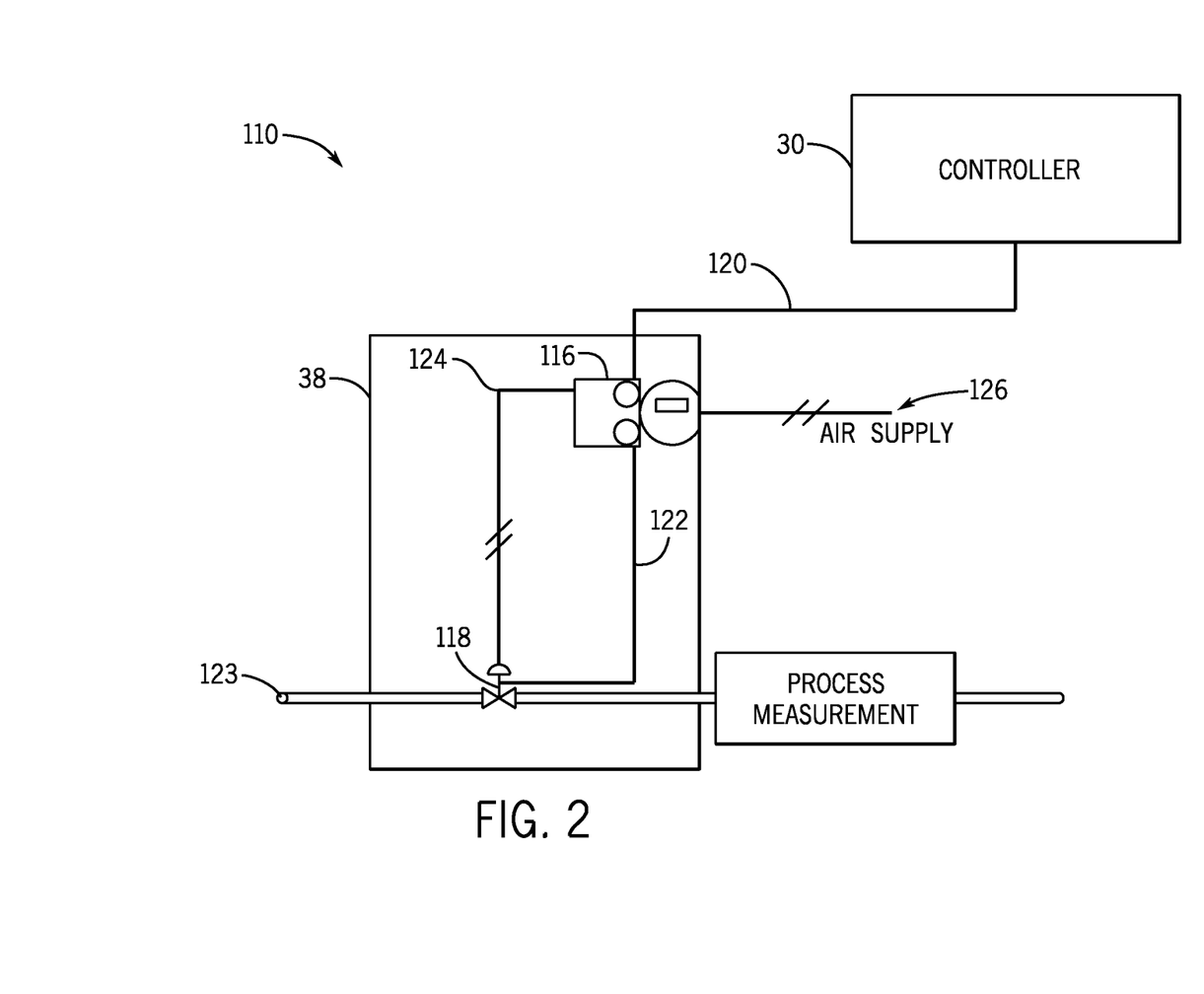
FIG. 2 is a schematic diagram of an embodiment of an industrial controller and a pneumatic valve.

FIG. 2 is a schematic diagram illustrating an embodiment of the industrial controller 30 controllably coupled to the pneumatic valve 38 of FIG. 1. The pneumatic valve 38 may include a valve body, a fluid path through the valve body, an inlet, and outlet, and a valve member that move in the fluid path to open and close the flow path. In addition, the pneumatic valve 38 may includes a positioner 116 and an actuator 118. The positioner 116 may be configured to receive a desired valve position from the controller 30 and provide a signal, such as air, to the actuator 118. An exemplary positioner 116 may be General Electric's Masoneilan SVI digital valve positioner with built-in magnetic position sensing and pressure sensors, available from General Electric Co., of Schenectady, N.Y. The actuator 118 may then change the signal into mechanical energy to move the valve member to the desired position. The valve member may move in either a linear or rotary manner. In a linear valve, the throughput of the valve may be changed by moving the valve member linearly in the valve. In a rotary valve, the throughput of the valve may be changed by rotating the valve member in the valve.

The actuator 118 may be different types including wheel and axle, pneumatic, hydraulic, solenoid, screw and manual. For example, in a pneumatic valve 38, the positioner 116 may increase or decrease the air supplied to the actuator 118 based on the desired valve position. Accordingly, the air supplied to the actuator 118 may move the valve member to the desire valve position. More specifically, in a functioning pneumatic valve 38, the industrial controller 30 may send control actions through conduit 120, according to a control strategy for the control system, to the positioner 116, which includes a desired valve position. The positioner 116 is then able to determine the current position of the actuator 118, for example, by using conduit 122, and determine the air pressure to supply to the actuator 118 to move the valve member to the desired position. The positioner 16 may the supply the determined amount of air from the air supply 126. In the depicted embodiment, the air supply 126 is located external to the pneumatic valve 38. The air may then be applied to the actuator 118 through fluid conduit 124 and the position of the valve member may be changed as desired.

An undesired condition may arise when the positioner 116 is unable to receive sufficient air pressure from the air supply 126, resulting in the positioner 116 having difficulty moving the actuator 118 to the desired position. In some cases, the industrial controller 30 may not be aware of the undesired condition (e.g., low air supply pressure) because the undesired condition is external to the valve 38 and thus not included in hardware and/or software health definitions of the valve 38. To account for this, the user may extend the control strategy and execute additional function blocks to collect the information; however, this may slow down the control process and reduce the quality of control. If the undesired condition is unaccounted for, the controller 30 may continue following the control strategy and operate as if the valve is in the correct position. This can cause undesired behavior in the system 10. For example, if the controller 30 derives that the valve 38 is more open than it actually is, this could result in a back up in pipe 123. In addition, when the controller 32 is a PID controller, if the controller 32 is unaware that the valve 38 is unable to move to follow the setpoint, the controller 32 may continue to integrate causing the error to build up the control output value, which may make the recovery process difficult. Thus, undesired conditions may be detected and communicated back to the industrial controller 30 as quickly as possible to, for example, more properly actuate the valve 38 or use a backup valve.

The techniques described below may be used in other field devices 38 including different types of valves (e.g., electric, electro-pneumatic, hydraulic, and electro-hydraulic valves), flow meters, pH sensors, temperature sensors, vibration sensors, clearance sensors (e.g., measuring distances between a rotating component and a stationary component), pressure sensors, pumps, and actuators. Similar to insufficient air pressure in the pneumatic valve 38, undesired conditions may not be included in the hardware and/or software definitions of the field device. For example, an electric valve that relies on electricity to activate the valve may suffer from an undesired condition such as insufficient power or incorrect frequency of the input from an external power source. Similarly, a wind pump that relies on wind power to supply energy to the pump may suffer from an undesired condition such as insufficient wind flow. Accordingly, FIG. 3 describes one technique to communicate the undesired conditions to the controller 30.

Figure 3:
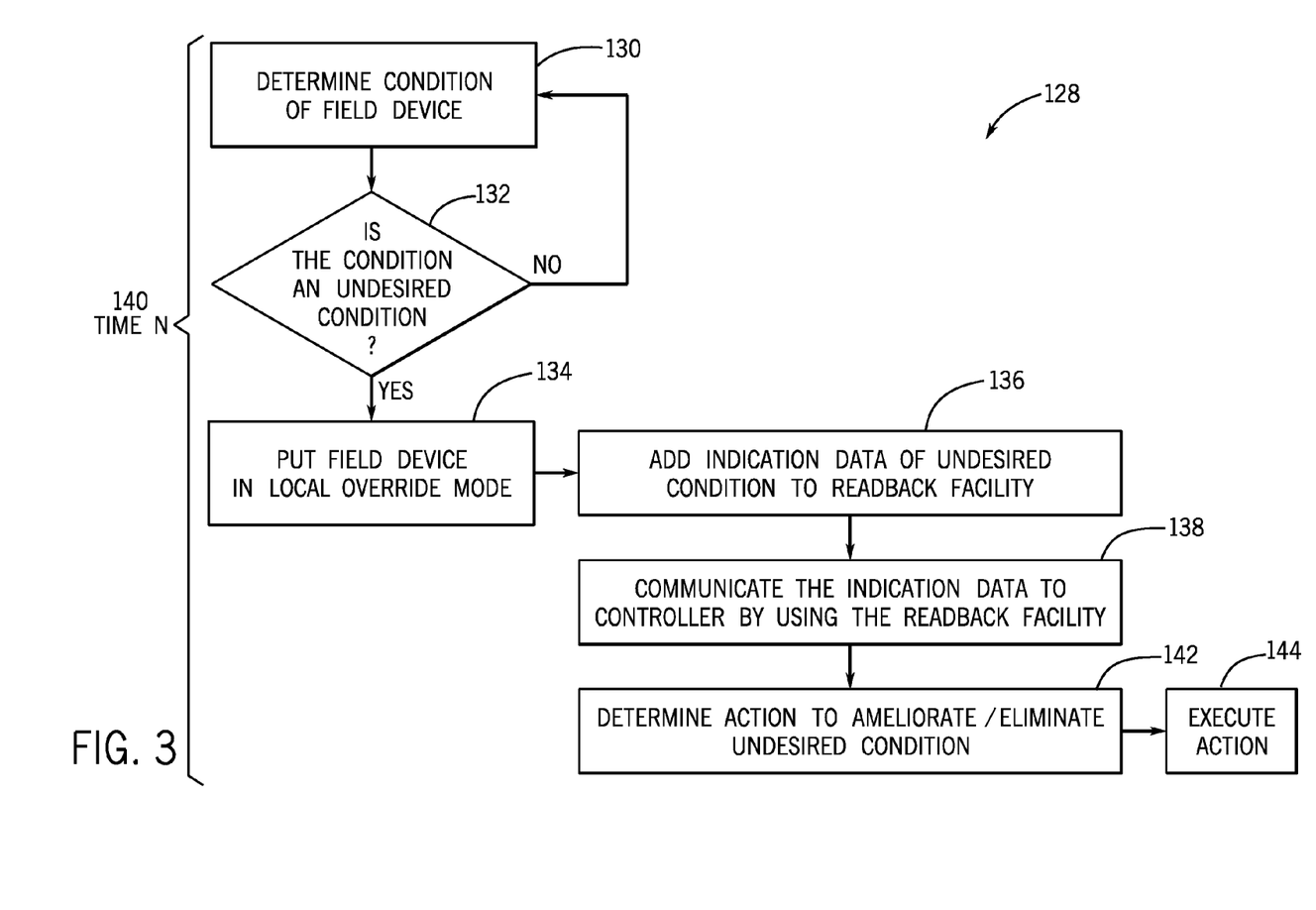
FIG. 3 is a flowchart of an embodiment of a process suitable for detecting, communicating, and ameliorating an undesired condition in field devices.

FIG. 3 is a flowchart of an embodiment of a process 128 suitable for detecting, communicating, and ameliorating an undesired condition using an embodiment of the field device feedback utilizing, for example, a ReadBack facility. As described above, the field device may be commissioned by the commissioning/decommissioning system 25 using a placeholder representative of the field device with the Read-Back facility.

The process 128 may be implemented by using computer instructions stored in a non-transitory computer-readable medium, such as the memory of a computer, server, laptop, tablet, cell phone, mobile device, or similar processing or computing device. The process 128 may begin by determining (block 130) the condition of the field device 38. The condition of the field device 38 may be determined by various sensors in the field device 38. For example, in the pneumatic valve 38 described in FIG. 2, a condition of "insufficient air pressure" may be determined when a sensor in the air supply 116 detects insufficient pneumatic pressure being supplied. Similarly, another condition of "foreign object present" may be determined when a sensor located within the pipe 123 detects a foreign object within the pipe. Other sensors in the pneumatic device 38 may be used to determine other conditions such as "valve not moving properly" when the vale is jamming, sticking, or generally not responding properly. A condition of "functioning properly" may be determined when none of the sensors in the field device 38 detect an issue.

The process 128 then determines whether (decision block 132) the condition is an undesired condition. As will be described in more detail with reference to FIG. 5, one embodiment utilizes a function block, such as a transducer function block, to determine whether the condition has to be reported. If the condition is not an undesired condition, the process 128 returns to block 130 and continues to monitor the condition (e.g., "insufficient air pressure" or "functioning properly") of the field device. If the condition of the field device is an undesired condition, the process 128 puts (block 134) the field device (e.g., valve 38) into a fault state such as Local Override Mode, which immediately stops the field device from trying to follow the industrial controller's instructions.

Next, the process 128 may add (block 136) indication data of the undesired condition to the ReadBack Facility. As will be described in more detail in reference to FIG. 5, the ReadBack Facility may be part of an Output function block that allows for the Output function block to feedback a signal to a control block, for example, through a sub-status/category. This may be implemented using the BKCAL_OUT and BKCAL_IN parameters. Specifically, Block 136 may be implemented by writing to the BKCAL_OUT parameter on the Output function block. The process 128 then uses the ReadBack facility to communicate (block 138) the indication data to the industrial controller 30, which may be implemented by reading the BKCAL_IN parameter on the control block. Similarly, if the undesired condition disappears, the process 128 may then use the ReadBack facility to communicate a status of good so that the control algorithm may resume normal control operations.

In one embodiment, the blocks 130, 134, 136, and 138 may execute within a Time N 140. In some embodiments, Time N 140 is 1-2 macrocycles, where a "macrocycle" refers to a cycle of scheduled function block execution, scheduled communication time, and a portion of time reserved for asynchronous communications. In other words, a macrocycle may be one control loop execution. The Foundation Fieldbus protocol may allow macrocycles to be configured at between 10-250, 100-500, 250-1000, 750-3000 or more milliseconds. Thus, by using the ReadBack techniques disclosed herein, the Time N 140 may be as fast as 10-250 milliseconds or 250-3000 milliseconds. The techniques herein enable a quicker notification of an undesired condition because it enables the undesired condition to be reported in 1-2 loop executions as compared to additional custom function blocks, which may poll for the undesired condition after a specified time, such as 30 seconds. A more detailed explanation of the functioning of the ReadBack facility within a macrocycle is described in FIG. 4.

Figure 4:
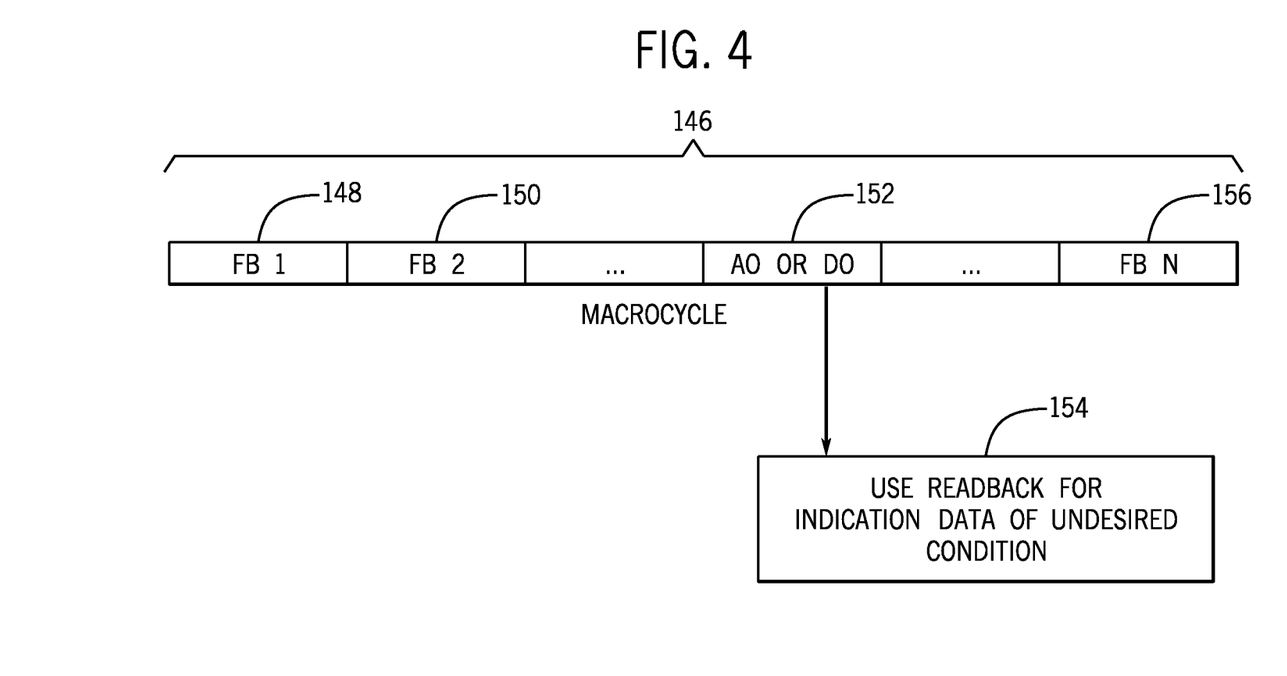
FIG. 4 is a timing diagram of an embodiment of an Output function block using a ReadBack facility to indicate an undesired condition during a macrocycle.

FIG. 4 is diagram of an embodiment of a macrocycle 146 including an Output function block (Analog or Digital) 152 having ReadBack facility for indicating the presence of an undesired condition. During the execution of the macrocycle 146, one or more function blocks may execute at desired time slots. As an example, these function blocks may include Alarm Detection Function Blocks, Analog Input Function Blocks, Calculation/Logic Function Blocks, Filter Function Blocks, and Arithmetic Function Blocks. In the depicted embodiment, the macrocycle 146 begins by executing function block 1 (FB1) at time slot 148 followed by function block 2 (FB2) at time slot 150, and so on. When the macrocycle reaches the Output function block (e.g., Analog Output (AO) or the Digital Output (DO)) time slot 152 and an undesired condition is detected, the Output function block may use the ReadBack facility to indicate (block 154) the undesired condition. The macrocycle 146 may continue executing function blocks until reaching function block N (FBN) at time slot 156. Then, the macrocycle 146 may repeat execution of function blocks, for example, by starting over with FB1 at time slot 148. By using the ReadBack facility, the techniques described herein provide for deterministic execution of processes associated with the controller 30. In other words, control may be provided at substantially the same execution time, even when undesired conditions are detected, and control actions may be modified correlative with the detected conditions. Accordingly, the undesired conditions may be overcome by control actions or notifications may be provided, thus improving the safety of the system 10.

Referring back to FIG. 3, once the industrial controller 30 receives the indication data, the process 128 may determine (block 142) at least one action to take in order to ameliorate or eliminate the undesired condition. For example, a backup valve may be used as an alternative to the malfunctioning valve, fluids may be transferred via an alternate pipe, alarms may be set, other systems may be notified, and so on. Finally, the process 128 may execute (144) the action to ameliorate or eliminate the undesired condition. As will be described in further detail in FIG. 5, block 142 and 144 may be executed in the control block.

Figure 5:
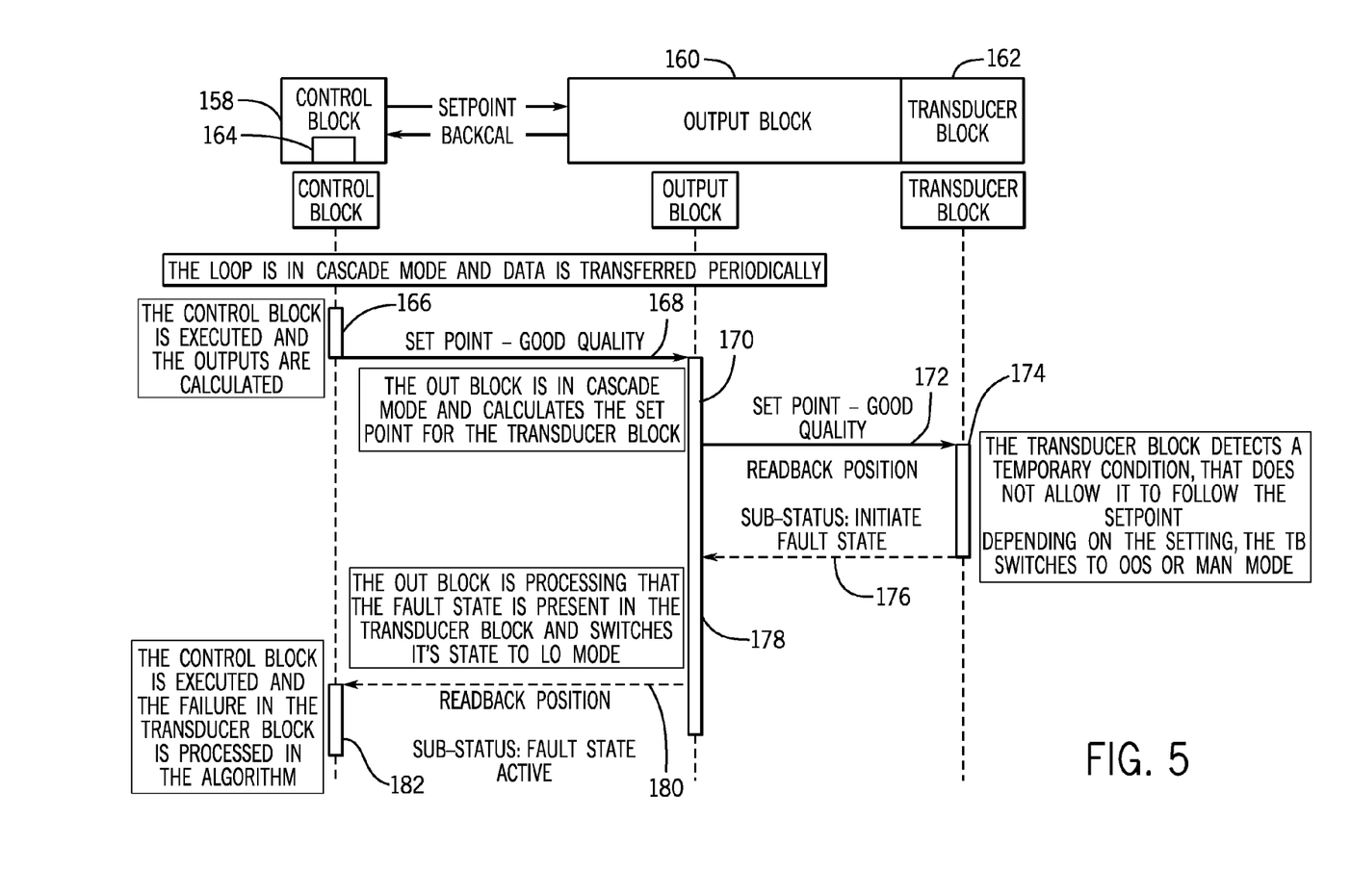
FIG. 5 is an information flow diagram showing embodiments of information being transferred between a control block, output block, and transducer block.

FIG. 5 is an information diagram showing embodiments of an information flow between a control function block 158, output function block 160, and transducer function block 162 in an exemplary embodiment. The information diagram may be executed in one macrocycle or one control loop. In some embodiments, the control block 158 is executed using the industrial controller 30 of FIG. 1. The industrial controller 30 is communicatively coupled to a first field device, such as the valve 30 having the output block 160 and the transducer block 162. In the depicted embodiment, the output block 160 and the control block 158 may communicate through one or more fieldbus publisher/subscriber (periodic) communication connections, as described above. The output block 160 and the transducer block 162 may be programmatically used in certain control algorithms so that data computed by using one or more function blocks may be used as inputs to other function blocks. It should be appreciated that, alternatively, all of the function blocks may be included in the same field device, e.g., valve 38, and/or in the controller 30.

To better illustrate the information flow, the function blocks 158, 160, and 162 can be described in relation to the pneumatic valve 38 in FIG. 2, and may include Foundation Fieldbus capabilities. The industrial controller 30, through the control function block 158, may implement a control strategy 164 to guide the functioning of the rest of the control system. Alternatively, the control function block 158 may be included in the field device 38. In some embodiments, the control block 158 may be a proportional-integral-derivative (PID) control block 158. Following the control strategy 164, the control block 158 may begin by calculating (process block 166) a desired valve position and passing (data flow 168) the information to the output function block 160, for example, as a first SetPoint. Because the output function block 160 may be in Cascade Mode (e.g., a mode that uses a master-slave configuration), it may use the first SetPoint to decide the value (process block 170) for a second SetPoint and pass (data flow 172) the second SetPoint to the transducer function block 162. This second SetPoint may be used to translate a standard fieldbus value to a value (analog or digital) that can be used by the transducer function block 162. In normal operation, as described above, the valve may move the actuator and the valve member to the desired position.

However, in the case of an undesired condition, the transducer function block 162 through the valve positioner may detect the condition and switch (process block 174) the transducer block 162 to Out-of-Service or Manual mode. In Out-of-Service mode, the function block is inactive and the output of the function block maintains the last value or a failure action value. In Manual mode, the output of the function block remains unchanged, until a new value is set by an operator. In this embodiment, the valve positioner 116 monitors the undesired condition (i.e. insufficient supply air pressure). The valve positioner 116 and/or other sensors and actuators can be used to monitor other/multiple undesired conditions, such as insufficient hydraulic pressure, insufficient wind power, or improper electric power (e.g. incorrect frequency). Also, potential undesired conditions can be monitored at the same time. The transducer block 162 may then use its ReadBack facility to return (data flow 176) a sub-status of Initiate Fault State. Once the output block 160 receives the Initiate Fault State sub-status, it may switch (process block 178) the output function block 160 from Cascade mode into Out of Service, Manual, or Local Override mode. In the Foundation Fieldbus protocol, these modes are part of output function blocks including the Analog Output (AO), the Digital Output (DO), or a combination thereof. The new mode may stop the output block 160 from using the first SetPoint and may instead set the second SetPoint to a specified value. Thus, the output block 160 may stop calculating the second SetPoint.

The output block 160 may the use the ReadBack facility to return (data flow 180) a sub-status of Failed State Active to notify the control function block 158 of the undesired condition in the field device. Additionally or alternatively, output function block 160 may return a sub-status of NotInvited or NotSelected. The ReadBack facility may be implemented by the BKCAL_OUT parameter on the output function block 160. The BKCAL_OUT parameter is used to communicate a value and a status, including sub-status, that may be required by the BKCAL_IN of another function block. The BKCAL_OUT parameter may be communicatively coupled to the BKCAL_IN parameter on the control function block 158. The two function blocks may communicate through a publish/subscribe protocol, which allows for the communications to be fast and deterministic in schedule. The BKCAL_OUT parameter may be used to help provide smooth mode transfer when the mode on the output function block 160 is changed by providing a value and status, including sub-status, to the control function block 158. The disclosed embodiments may instead use the sub-status in the BKCAL_OUT parameter to inform the control function block 158 that an undesired condition is present. In addition, the output block 160 may return a status that indicates the limited SetPoint so that recovery may be bumpless.

Without the disclosed embodiments, when the Output function block 160 is assigned to a field device, such as a valve, the BKCAL_OUT parameter may be used to communicate information such as actuator position. In other words, without the disclosed embodiments, the BKCAL_OUT parameter may be used to communicate conditions affecting mode and status that are related to the hardware and/or software health of the field device using the ReadBack facility. The disclosed embodiments, on the other hand, use the Output function block 160 that communicates undesired conditions not included in the hardware and/or software health of the field device, such as the insufficient air pressure being supplied by the air supply 126 or other conditions related to systems external to the field device. Thus, the disclosed embodiments have adapted the BKCAL_OUT parameter to communicate conditions that previously were either not being communicated to the control strategy or were communicated using additional and/or custom function blocks to communicate to the control strategy.

Once the sub-status is read by the control function block 158, the control function block 158 may automatically use the control strategy 164 to determine an ameliorative action (process block 182). For example, the control function block 158 may use a second field device, like an alternative valve, as a backup. This provides for redundancy in the operation for the first field device. Other ameliorative actions include shutting down a pump, disallowing the process to start, issuing alerts, communicating with an operator or with other systems. In addition, when the control function block 158 is a PID control function block 158, the PID control function block 158 may stop integrating the error and changing the SetPoint. This may assist in a faster recovery because once recovered, the Output Block 160 will resume using the most recent SetPoint. Accordingly, it should be appreciated that the integrating should cease as quickly as possible, which may be accomplished through the techniques described herein. Specifically the integrating may cease within one macrocycle.

Similar to reporting an undesired condition, recovery may be accomplished within one macrocycle. In the recovery process, the Output function block 160 may notify the control function block 158 using the same ReadBack facility. Accordingly, the control function block 158 may resume normal operation within one macrocycle or one control loop execution.

In other embodiments, such as in when the function blocks are in a cascade loop, the control function block 158 may act similarly to the Output function block 160 and use its ReadBack facility to notify another control function block 158 of the undesired condition. In other words, the presence of the undesired condition may be passed between coupled control function blocks 158 through the ReadBack facility. Accordingly, similar to the techniques described above, the time to communicate the presence of an undesired condition between the control function blocks 158 may be one macrocycle 146.

Technical effects of the described embodiments include efficiently enabling the field device 38 to communicate the presence of an undesired condition, such as insufficient pneumatic pressure, to a controller 30. In particular, the field device 38 may be able to utilize the feedback function, specifically the ReadBack facility, on the Output function block 160. In other words, the field device 38 may be able to communicate the presence of the undesired condition using the existing function blocks without additional bandwidth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial automation system comprising:
   a first field device comprising a Foundation Fieldbus output function block comprising a Readback facility, wherein the first field device is configured to:
      receive instructions to implement a SetPoint;
      detect when an undesired condition related to an external condition of the first field device is present;
      automatically switch to a Manual mode, an Out of Service mode, or a Local Override mode when the undesired condition is detected to stop the first field device from attempting to implement the SetPoint; and
      communicate a sub-status code/category using a BKCAL_OUT parameter of the Foundation Fieldbus output function block to indicate occurrence of the undesired condition; and
   an industrial controller communicatively coupled to the first field device, wherein the industrial controller is configured to:
      communicate the Setpoint to the first field device;
      receive the sub-status code/category from the first field device; and
      adjust operation of the industrial automation system based at least in part on the sub-status code/category.

2. The industrial automation system of claim 1, wherein the first field device comprises a Foundation Fieldbus field device.

3. The industrial automation system of claim 1, wherein the Foundation Fieldbus output function block comprises a Foundation Fieldbus digital output (DO) function block, a Foundation Fieldbus analog output (AO), or a combination thereof.

4. The industrial automation system of claim 1, wherein the Foundation Fieldbus output function block is configured to transmit the sub-status code/category to the industrial controller using a publish/subscribe protocol.

5. The industrial automation system of claim 1, wherein the sub-status code/category comprises a Fault State Active sub-status, a NotInvited sub-status, or a NotSelected sub-status.

6. The industrial automation system of claim 1, wherein the first field device comprises:
   a valve comprising an inlet and an outlet;
   an actuator configured to control flow between the inlet and the outlet; and
   a positioner coupled to the actuator, wherein the positioner is configured to control position of the actuator.

7. The industrial automation system of claim 6, wherein the positioner comprises:
   a linear positioner configured to transform linear motion into an actuator position;
   a rotary positioner configured to transform rotary motion into the actuator position;
   or both.

8. The industrial automation system of claim 1, wherein the industrial controller comprises a control function block configured to:
   determine the SetPoint before communication to the field device;
   receive the sub-status code/category using a BKCAL_IN parameter of the control function block; and
   determine adjustment to operation of a second field device in the industrial automation system based on the sub-status code/category, wherein the second field device is configured to provide redundant operation with the first field device.

9. The industrial automation system of claim 1, comprising a commissioning system configured to create a placeholder that represents the first field device during commissioning of the first field device.

10. The industrial automation system of claim 1, wherein the industrial automation system comprises a gas turbine system, a gasification system, a steam turbine system, a wind turbine system, a water turbine system, a power generation system, or any combination thereof.

11. A method, comprising:
   determining, using a processor of a field device, whether an undesired condition related to an external condition of the field device is present; and
   when the undesired condition is detected:
      instructing, using the processor, the field device to automatically switch to a Manual mode, an Out of Service mode, or a Local Override mode to stop the field device from attempting to implement a SetPoint received from a control function block of an industrial controller;
      determining, using the processor, a first sub-status code/category, wherein the sub-status category is configured to indicate presence of the undesired condition; and
      instructing, using the processor, a Foundation Fieldbus output function block of the field device to communicate the first sub-status code/category to the control function block using a BKCAL_OUT parameter of Foundation Fieldbus output function block to enable the control function block to adjust operation of an industrial automation system comprising the field device based at least in part on the sub-status category.

12. The method of claim 11, wherein the sub-status code/category comprises a Fault State Active sub-status, a NotInvited sub-status, or a NotSelected sub-status.

13. The method of claim 11, wherein:
   the Foundation Fieldbus output function block comprises first field device comprises a Foundation Fieldbus digital output (DO) function block, a Foundation Fieldbus analog output (AO), or a combination thereof.

14. The method of claim 11, comprising:
   determining, using the processor, whether the field device has recovered from the undesired condition; and when recovery is detected:
: determining, using the processor, a second sub-status code/category to indicate recovery of the field device from the undesired condition; and
: instructing, using the processor, the Foundation Fieldbus output function block to communicate the second sub-status code/category to the control function block using the BKCAL_OUT parameter to enable the control function block to determine the recovery of the field device and to adjust operation of the industrial automation system accordingly.

15. The method of claim 11, wherein the industrial automation system comprises a gas turbine system, a gasification system, a steam turbine system, a wind turbine system, a water turbine system, a power generation system, or any combination thereof.

16. A non-transitory tangible computer-readable medium configured to store a plurality of instructions executable by a processor of a field device, wherein the instructions comprise instructions to:
: determine, using the processor, whether an undesired condition related to an external condition of the field device is present;
: when the undesired condition is detected:
:: instruct, using the processor, the field device to automatically switch to a Manual mode, an Out of Service mode, or a Local Override mode to stop the field device from attempting to implement a SetPoint received from a control function block of an industrial controller;
: determine, using the processor, a sub-status code/category, wherein the sub-status category is configured to indicate occurrence of the undesired condition; and
: instruct, using the processor, a Foundation Fieldbus output function block of the field device to communicate the sub-status code/category to the control function block using a BKCAL_OUT parameter of Foundation Fieldbus output function block to enable the control function block to adjust operation of an industrial automation system comprising the field device based at least in part on the sub-status code/category.

17. The medium of claim 16, wherein:
the Foundation Fieldbus output function block comprises first field device comprises a Foundation Fieldbus digital output (DO) function block, a Foundation Fieldbus analog output (AO), or a combination thereof; and
the sub-status code/category comprises a Fault State Active sub-status, a NotInvited sub-status, or a NotSelected sub-status.

* * * * *